US012096410B2

(12) United States Patent
Tiirola et al.

(10) Patent No.: US 12,096,410 B2
(45) Date of Patent: Sep. 17, 2024

(54) POWER SAVING FOR IOT RADIO SYSTEMS

(71) Applicant: NOKIA TECHNOLOGIES OY, Espoo (FI)

(72) Inventors: Esa Tapani Tiirola, Oulu (FI); Kari Pekka Pajukoski, Oulu (FI); Srinivasan Selvaganapathy, Bangalore (IN); Nitin Mangalvedhe, Hoffman Estates, IL (US); Rapeepat Ratasuk, Inverness, IL (US)

(73) Assignee: Nokia Technologies Oy, Espoo (FI)

( * ) Notice: Subject to any disclaimer, the term of this patent is extended or adjusted under 35 U.S.C. 154(b) by 383 days.

(21) Appl. No.: 17/291,834

(22) PCT Filed: Oct. 16, 2019

(86) PCT No.: PCT/EP2019/078097
§ 371 (c)(1),
(2) Date: May 6, 2021

(87) PCT Pub. No.: WO2020/094348
PCT Pub. Date: May 14, 2020

(65) Prior Publication Data
US 2021/0392643 A1 Dec. 16, 2021

(30) Foreign Application Priority Data
Nov. 7, 2018 (IN) ............................ 201841042057

(51) Int. Cl.
H04W 4/00 (2018.01)
H04W 56/00 (2009.01)
(Continued)

(52) U.S. Cl.
CPC ..... *H04W 72/0453* (2013.01); *H04W 56/001* (2013.01); *H04W 52/02* (2013.01)

(58) Field of Classification Search
CPC . H04W 72/04; H04W 72/0453; H04W 52/02; H04W 56/00; H04W 56/001
See application file for complete search history.

(56) References Cited

U.S. PATENT DOCUMENTS

2005/0025490 A1 2/2005 Aoki et al.
2015/0146640 A1 5/2015 Baldemair et al.
(Continued)

FOREIGN PATENT DOCUMENTS

CN 1301467 A 6/2001
WO 99/35865 A1 7/1999
(Continued)

OTHER PUBLICATIONS

First Examination Report for Indian Application No. 202147024346 dated Feb. 23, 2022, 9 pages.
(Continued)

*Primary Examiner* — Elisabeth Benoit Magloire
(74) *Attorney, Agent, or Firm* — Barta Jones, PLLC

(57) ABSTRACT

A method includes performing, by a terminal device, a sub-bandwidth part based operation. The method includes determining a requirement for radio frequency retuning, and switching from the sub-bandwidth part based operation to a bandwidth part based operation. The method also includes performing the bandwidth part based operation.

20 Claims, 9 Drawing Sheets

(51) Int. Cl.
*H04W 72/0453* (2023.01)
*H04W 52/02* (2009.01)

(56) References Cited

U.S. PATENT DOCUMENTS

| | | |
|---|---|---|
| 2015/0181603 A1 | 6/2015 | Wakabayashi |
| 2015/0230249 A1 | 8/2015 | Nguyen et al. |
| 2016/0330739 A1 | 11/2016 | Webb et al. |
| 2016/0359660 A1 | 12/2016 | Blankenship et al. |
| 2018/0020366 A1 | 1/2018 | Martin et al. |
| 2019/0037579 A1* | 1/2019 | Yi .................... H04L 5/0098 |
| 2019/0090299 A1* | 3/2019 | Ang ................ H04W 52/0229 |
| 2019/0132109 A1* | 5/2019 | Zhou ................. H04L 5/0098 |
| 2019/0349815 A1* | 11/2019 | Tiirola ................ H04W 72/12 |
| 2021/0058964 A1* | 2/2021 | Hooli ................ H04W 74/008 |

FOREIGN PATENT DOCUMENTS

| | | | |
|---|---|---|---|
| WO | WO 2018/085145 A1 | 5/2018 | |
| WO | WO-2020087470 A1 * | 5/2020 | ............ H04W 72/04 |

OTHER PUBLICATIONS

International Search Report and Written Opinion for Patent Cooperation Treaty Application No. PCT/EP2019/078097 dated Jan. 29, 2020, 14 pages.
Sony, "Adaptive Power Saving Techniques Based on UE Power Consumption Characteristics", 3GPP TSG RAN WG1 Meeting #95, R1-1812749, (Nov. 12-16, 2018), 5 pages.
"IEEE 802.11ah", Wikipedia, Retrieved on Dec. 18, 2023, Webpage available at : https://en.wikipedia.org/wiki/IEEE_802.11ah.
"802.15.4x-2019—IEEE Standard for Low-Rate Wireless Networks—Amendment 7: Defining Enhancements to the Smart Utility Network (SUN) Physical Layers (PHYs) Supporting up to 2.4 Mb/s Data Rates", IEEE Computer Society, 2019, 30 pages.

* cited by examiner

200

| | Available OFDM numerologies for 5G New Radio, Normal CP length (NR Phase I) | | | | | |
|---|---|---|---|---|---|---|
| 210 | Subcarrier spacing [kHz] | 15 | 30 | 60 | 120 | 240 |
| 220 | Symbol duration [us] | 66.7 | 33.3 | 16.7 | 8.33 | 4.17 |
| 230 | Nominal Normal CP [us] | 4.7 | 2.3 | 1.2 | 0.59 | 0.29 |
| 240 | Min scheduling interval (symbols) | 14 | 14 | 14 | 14 | 28 |
| 250 | Min scheduling interval (slots) | 1 | 1 | 1 | 1 | 2 |
| 260 | Min scheduling interval (ms) | 1 | 0.5 | 0.25 | 0.125 | 0.125 |

270 LTE

| Subcarrier spacing [kHz] | 15 | 30 | 60 | 120 | 240 | |
|---|---|---|---|---|---|---|
| Max Bandwidth, 2k FFT(MHz) | 25 | 50 | 100 | 200 | 400 | FFT size used already in LTE |
| Max Bandwidth, 4k FFT(MHz) | 50 | 100 | 200 | 400 | 800 | RAN4: Feasible FFT size |
| Max Bandwidth, 8k FFT(MHz) | 100 | 200 | 400 | 800 | 1600 | RAN4: Feasibility of 8k FFT is FFS |

Combinations with red colour are outside of Rel-15

Fig. 3

POWER SAVING FOR IOT RADIO SYSTEMS

CROSS-REFERENCE TO RELATED APPLICATIONS

This application is a national phase entry of International Application No. PCT/EP2019/078097, filed Oct. 16, 2019, which claims priority to Indian Application No. 201841042057, filed Nov. 7, 2018, the entire contents of which are incorporated herein by reference.

TECHNICAL FIELD

The teachings in accordance with exemplary embodiments relate generally to power efficiency improvement for various applications (such as smart phones, for example) operating in specific scenarios, and particularly, to radio systems, focusing especially on Machine Type Communication (MTC)/Internet of Things (IoT), for example.

BACKGROUND

Machine-like terminals including, for example, supervision cameras, vending machines, smart meters, human sensors, internet type of things etc., that use MTC are envisioned to create a lot of traffic for further cellular networks. The main requirements for MTC are low power consumptions and cheap price of devices. The requirement for low power consumption is typically more critical for MTC devices compared to typical mobile phone/smart phone. This is due to the fact that the battery of handsets can be easily charged (or, for example, recharged) whereas this is not generally the case with MTC devices. For certain type of MTC devices, a life time in the order of one or more years is required even with a clock size battery. On the other hand, cheap price may require that MTC devices can have limited transceiver and receiver capabilities (compared to other devices).

The main requirements of 5G MTD (Machine Type Device) are that the devices can consume or generate any amount of data within a short time frame, the devices may require millisecond level reaction time (or latency), and the device may also sleep for months and send a byte every now and then. MTC specific radio technologies include, for example, ZigBee, Bluetooth 4.0, low power WiFi, 802.11ah and IEEE 802.15.4x. However, cellular MTC has benefits such as ubiquitous coverage & global connectivity, better QoS due to licensed spectrum and free (for example, existing) signals available for synchronization.

Certain abbreviations that may be found in the description and/or in the Figures are herewith defined as follows:
BWP Bandwidth Part
CORESET Control Resource Set
CP Cyclic Prefix
DCI Downlink control information
DL Down link
DMRS Demodulation Reference Signal
DRX Discontinuous Reception
eNB enhanced Node-B
FDM Frequency Division Multiplexing
FDMA Frequency Division Multiple Access
FFT Fast Fourier Transform
gNB 5G Enhanced Node B (Base station)
IOT Internet of Things
L3 Layer 3
LTE long term evolution
MCS Modulation and Coding scheme
MIMO Multiple-Input Multiple-Output
MTC Machine Type Communications
MTD Machine Type Device
MU-MIMO Multi-User MIMO
NB Narrowband
NB-IoT Narrowband Internet of Things
NR New radio
NZP Non-zero power
OCC Orthogonal Cover Code
OFDM Orthogonal FDM
OPEX Operating Expenditure
PBCH Physical Broadcast Channel
PDCCH Physical downlink control channel
PRACH Physical random access channel
PRB Physical resource block
PRS Positioning Reference Signal
PSS Primary Synchronization Signal
PUSCH Physical uplink shared channel
QoS Quality of Service
RAN4 3GPP RAN working group dealing with radio frequency aspects
Rel Release
RNTI Radio Network Temporal Identifier
SC-FDMA Single Carrier FDMA
SCS Subcarrier Spacing
SRS Sounding Reference Signal
SSB Synchronization Signal Block
SSBI Synchronization Signal Block Index
SSS Secondary Synchronization Signal
SU-MIMO Single-User MIMO
TA Timing Advance
TRS Tracking Reference Signal
UE User Equipment
UL Uplink
3GPP 3rd Generation Partnership Project

BRIEF SUMMARY

The following summary includes examples and is merely intended to be exemplary. The summary is not intended to limit the scope of the claims.

In accordance with one aspect, an example method comprises performing, by a terminal device, a sub-bandwidth part based operation. The method includes determining a requirement for radio frequency retuning, and switching from the sub-bandwidth part based operation to a bandwidth part based operation. The method also includes performing the bandwidth part based operation.

In accordance with another aspect, an example apparatus comprises means for performing a sub-bandwidth part based operation; means for determining a requirement for radio frequency retuning; means for switching from the sub-bandwidth part based operation to a bandwidth part based operation; and means for performing the bandwidth part based operation.

In accordance with another aspect, an example apparatus comprises at least one processor; and at least one non-transitory memory including computer program code, the at least one memory and the computer program code may be configured to, with the at least one processor, cause the apparatus to: perform a sub-bandwidth part based operation; determine a requirement for radio frequency retuning; switch from the sub-bandwidth part based operation to a bandwidth part based operation; and means for perform the bandwidth part based operation.

In accordance with another aspect, an example apparatus comprises a non-transitory program storage device readable by a machine, tangibly embodying a program of instructions executable by the machine for performing operations, the operations comprising: performing, by a terminal device, a sub-bandwidth part based operation; determining a requirement for radio frequency retuning; switching from the sub-bandwidth part based operation to a bandwidth part based operation; and performing the bandwidth part based operation.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 2 illustrates an example table of radio system numerology options;

FIG. 3 illustrates an example table of maximum channel bandwidth as a function of subcarrier spacing and FFT size;

DETAILED DESCRIPTION

In the example embodiments as described herein a method and apparatus that provides improved power saving for (for example, NR) IoT networks. The example embodiments provide a cellular based MTC framework targeted to maximize battery life time and minimized overhead for cellular system. The example embodiments provide support for radio access technology (for example, 5G) for a diverse set of data applications.

Figure 1:
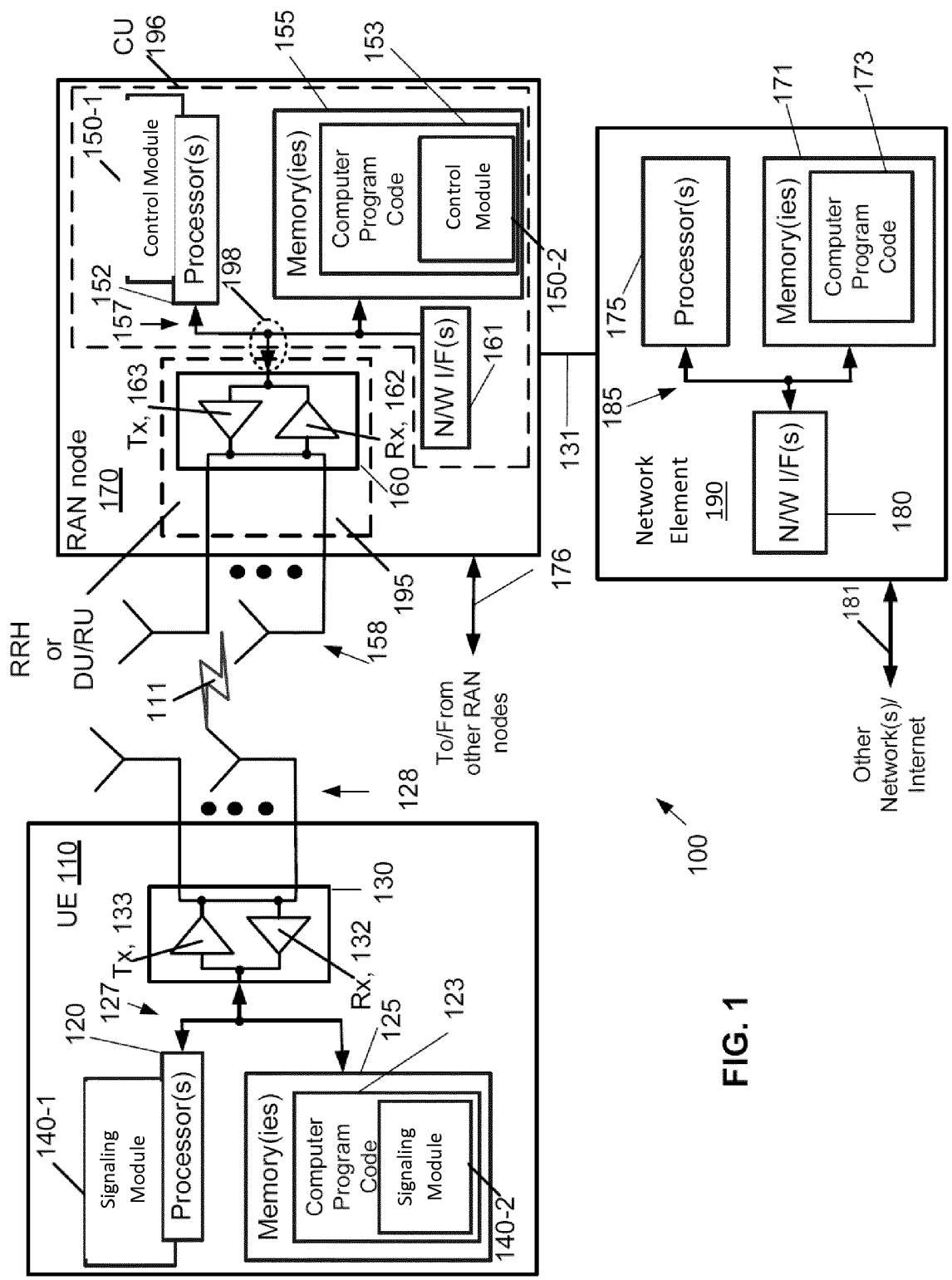
FIG. 1 is a block diagram of one possible and non-limiting example system in which the example embodiments may be practiced.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a signaling module 140, comprising one of or both parts 140-1 and/or 140-2, which may be implemented in a number of ways. The signaling module 140 may be implemented in hardware as signaling module 140-1, such as being implemented as part of the one or more processors 120. The signaling module 140-1 may be implemented also as an integrated circuit or through other hardware such as a programmable gate array. In another example, the signaling module 140 may be implemented as signaling module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s) RAN node 170 may be implemented by IAB node. For example, DU part of the JAB node may facilitate gNB functionality, where MT part of the JAB node facilitates the backhaul connection to anther IAB node, or to RAN node 170.

The wireless network 100 may include a network element (or elements) 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

Having thus introduced one suitable but non-limiting technical context for the practice of the exemplary embodiments of this invention, the exemplary embodiments will now be described with greater specificity.

FIG. 2 illustrates an example table 200 of radio system numerology options, such as, for example, those defined in NR Release 15.

As shown in FIG. 2, available OFDM numerologies for radio systems may include subcarrier spacing (kHz) 210, symbol duration (µs) 220, nominal normal CP (µs) 230, minimum (min.) scheduling interval (symbols) 240, min. scheduling interval (slots) 250, min. scheduling interval (ms) 260. The first column 270 indicates the values for LTE systems as well as for NR based on 15 kHz subcarrier spacing.

NR numerology options shown in Table 200 are based on subcarrier spacing of $15*2^N$ kHz, where N=0 corresponds to subcarrier spacing of LTE. Subcarrier spacings [15 30 60] kHz applicable for wide area on traditional cellular bands, for example, for dense-urban. 30/60 kHz SCS provides lower latency and wider carrier BW compared to 15 kHz SCS. 60 kHz or higher is needed for >10 GHz bands, for example, to combat phase noise.

Below 6 GHz, as described with respect to table 200, RAN4 agreements for subcarrier spacing in Rel-15 is the following: [15, 30, 60] kHz. 6 . . . 52.6 GHz: [60, 120] kHz, 240 kHz can be considered if clear benefits are shown. RAN4 agreements for minimum/maximum channel bandwidth in Rel-15 is the following below 6 GHz: 5 MHz/100 MHz. 6 . . . 52.6 GHz: 50 MHz/400 MHz.

Referring now to FIG. 3, table 300 shows a maximum channel bandwidth as a function of subcarrier spacing and the FFT size.

FFT size as such is an implementation issue. However, it can be noted that 4k FFT is needed to support a maximum channel BW (400 MHz) on particular band. Hence, it can be seen as a feasible FFT size for NR UEs.

Figure 4:
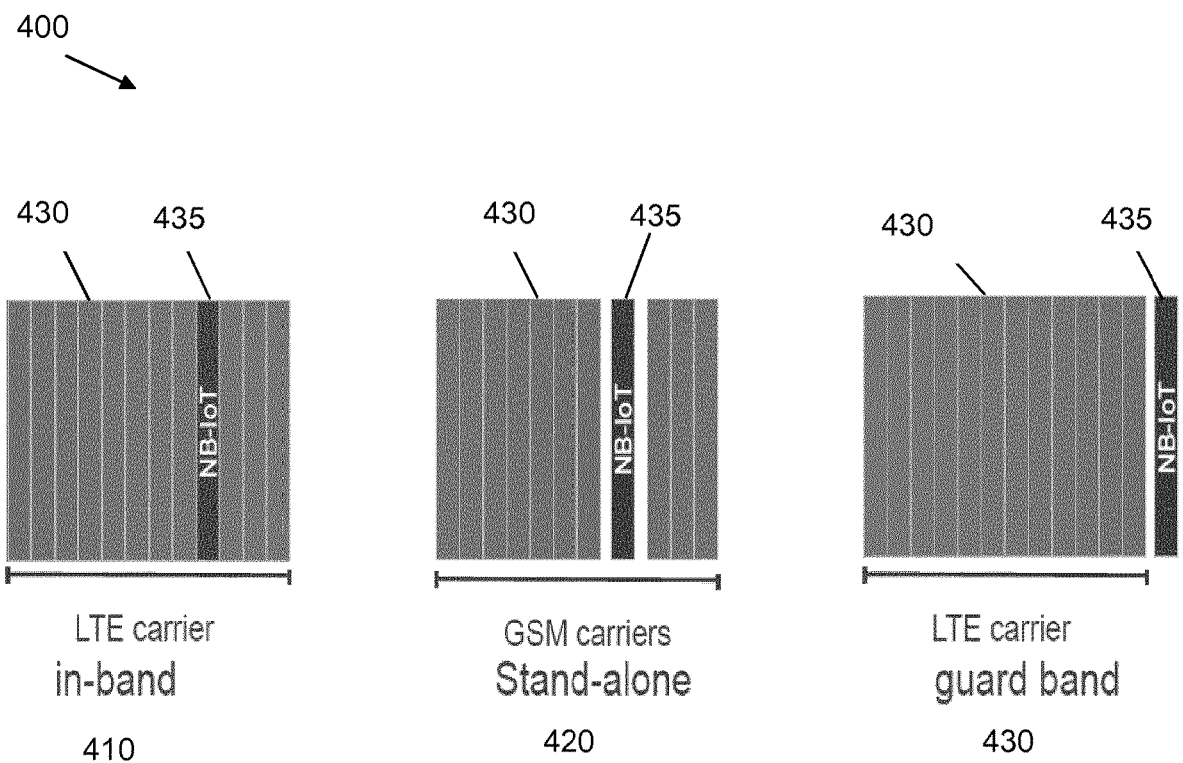
FIG. 4 illustrates example embodiments of different modes of operation defined for NB-IoT.

FIG. 4 illustrates example embodiments, particularly 3 different modes of operation defined for NB-IoT.

With regard to narrowband Internet of Things (Nb-IOT), LTE provides support for NB-IOT with the following design options. Only FDD mode with normal CP length. 180 kHz UE RF bandwidth for both DL and uplink. DL utilizes OFDMA with 15 kHz subcarrier spacing: 12 subcarriers are available in one NB-IOT carrier. UL utilizes SC-FDMA and supports two options single tone transmission and multi-tone transmission. The single tone transmission may be implemented with 3.75 kHz SCS. Alternatively, single tone transmission may be with 15 kHz SCS. Multi-tone (3, 6, 12) tone transmission may be implemented with 15 kHz SCS.

As shown in FIG. 4, Nb-IOT supports 3 different modes of operation: in-band 410, stand-alone 420, and guard band 430. In-band 410 may include the NB-IOT 435 in-band within the other bands 430. Stand-alone 420 may have the Nb-IOT 435 as a stand-alone band within the other bands 430 but with spacing between Nb-IOT 435 and the other bands 430. Guard band 430 may have the Nb-IOT 435 spaced after other bands 430.

With regard to NR BWP operation, Rel-15 NR provides details of serving cell adaptive BW by means of BWPs. In Rel-15 NR, UE 110 is instructed to operate on a specific part of gNB's 170 BW, that is, on a BWP. Up to 4 BWPs can be configured separately for UL and DL. The majority of RRC parameters in NR are configured on a BWP, each BWP can have, for example, separately configured subcarrier spacing (SCS), cyclic prefix, BW in terms of contiguous PRBs as well as location of the BW in the cell's total BW, K0, K1 and K2 values defining the time offsets from DL assignment reception to the beginning of PDSCH, from the end of PDSCH to HARQ-ACK transmission time, and from UL grant reception to the start of PUSCH transmission, respectively. In case of unpaired spectrum (for example, TDD), UL and DL BWPs can be paired, in which case the centre frequency of both BWPs is required to be the same. One of the BWPs may be defined as default BWP, for example, to facilitate UE 110 battery saving.

In Rel-15 NR, UE 110 may have only one BWP active at a time. Active BWP may be indicated by a field in the DCI or by RRC signalling. BWP switching occurs after UE 110 has received the signalling changing the active BWP, but switching time is yet to be determined. The switching time may be, for example, on the order of 0.4-0.6 ms. The minimum switching time for an UE 110 may vary according the scenario (such as carrier frequency, bandwidth) as well as the UE 110 category. UE 110 may also fall-back to default BWP after a configured period of inactivity.

Figure 5:
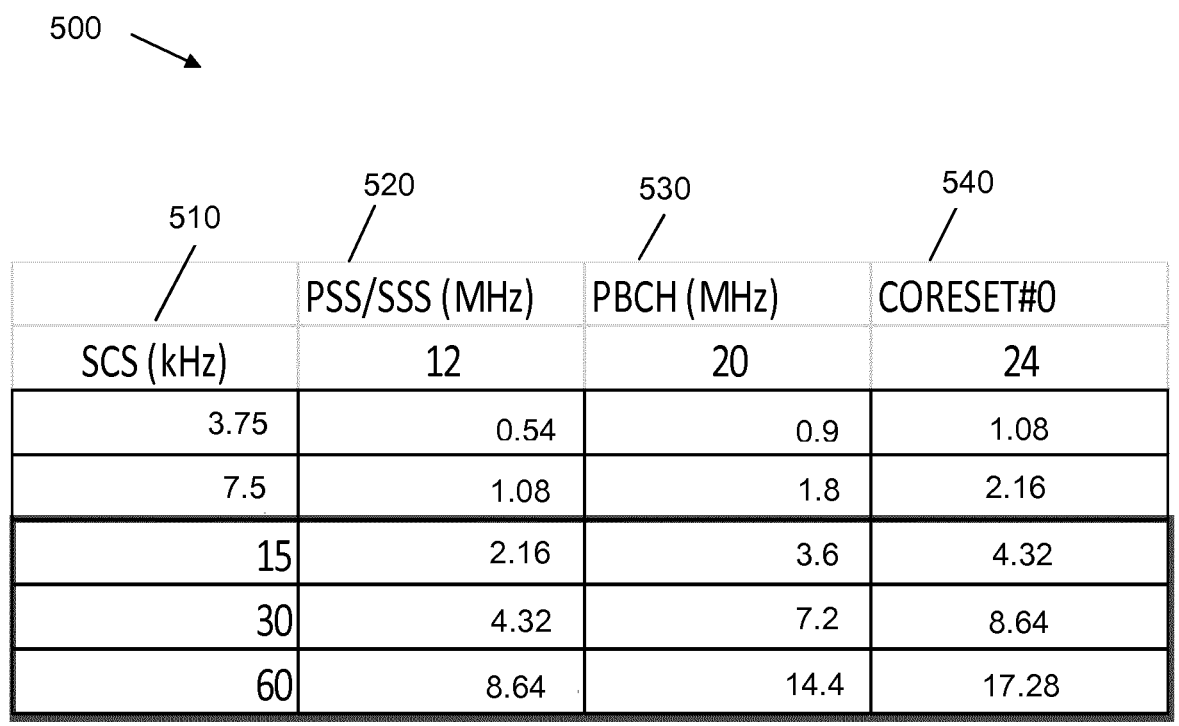
FIG. 5 illustrates an example table with bandwidth of different signals for different radio system numerologies.

FIG. 5 illustrates an example table 500 with bandwidth of different signals for different radio system (for example, NR) numerologies supported by NR (15, 30, 60), and for two additional example numerologies (3.75, 7.5) that may be implemented in a radio system according to example embodiments.

As shown in FIG. 5, SCS (kHz) 510 may be provided of 3.75, 7.5, 15, 30, and 60. Each SCS 510 has a corresponding PSS/SSS (MHz) 520 of 12 PRBs, PBCH (MHz) 530 of 20 PRBs, and CORESET #0 540 of 24 PRBs. SCS 510 of 3.75 may have a corresponding PSS/SSS (MHz) 520 of 0.54, PBCH (MHz) 530 of 0.9, and CORESET #0 540 of 1.08. SCS 510 of 7.5 may have a corresponding PSS/SSS (MHz) 520 of 1.08, PBCH (MHz) 530 of 1.8, and CORESET #0 540 of 2.16. SCS 510 of 15 may have a corresponding PSS/SSS (MHz) 520 of 2.16, PBCH (MHz) 530 of 3.6, and CORESET #0 540 of 4.32. SCS 510 of 30 may have a corresponding PSS/SSS (MHz) 520 of 4.32, PBCH (MHz) 530 of 7.2, and CORESET #0 540 of 8.64. SCS 510 of 60 may have a corresponding PSS/SSS (MHz) 520 of 8.64, PBCH (MHz) 530 of 14.4, and CORESET #0 540 of 17.28.

BWP bandwidth is connected (for example, proportionally) to UE 110 power consumption: the smaller the RF bandwidth, the smaller the UE 110 power consumption. NR Rel-15 based on current numerologies (such as 15 kHz subcarrier spacing) suffers from significant power consumption (compared to LTE-M and NB-IOT). This is due to the fact that minimum BWP size per UE 110 (in DL) is limited to 24 PRBs (SSB/CORESET #0). The minimum BWP size for different SCSs relevant to operation at frequencies below 6 GHz are shown in table 500.

Note that operation with 15 kHz SCS (the smallest SCS supported at the moment) requires that DL BWP size is at least 4.32 MHz. With example embodiments of SCS 3.75 kHz, this number reduces down to 1.08 MHz.

In order to reduce UE 110 power consumption, example embodiments may operate with BWP smaller than 24 PRBS. On the other hand, re-design of existing systems (which include BWP of 24 PRBS) should be avoided whenever possible. For example, DL control channel structure is a complicated subsystem (for both UE 110 and gNB 170). Therefore, the example embodiments operate the BWP, for example, with 24 PRBs. Also from overhead point of view, the example embodiments may provide low-power operation using existing signals defined for "normal" NR operation.

Latency is one of the key requirements defined for radio systems, such as 5G. In the case of IOT scenarios, low latency is desired especially for UL initiated transmission. The example embodiments provide systems and methods that achieve low latency and small power consumption at the same time.

Figure 6:
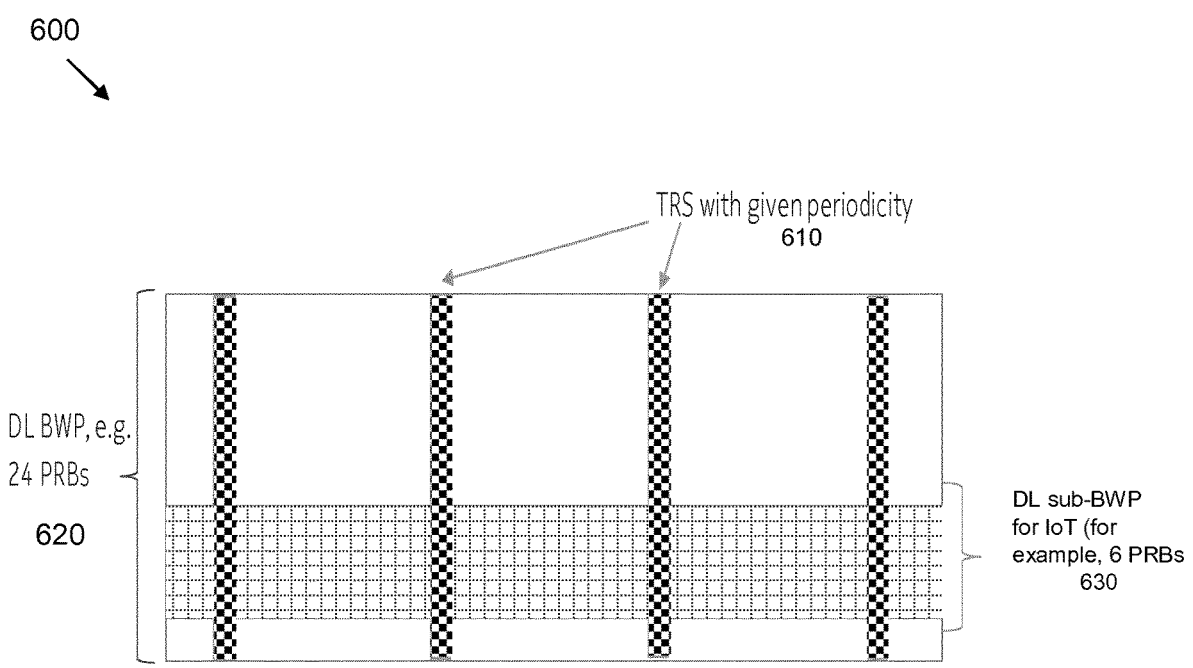
FIG. 6 illustrates an example embodiment of a DL BWP scenario.

FIG. 6 illustrates an example embodiment of a DL BWP scenario 600. Scenario 600 includes a TRS (Tracking Reference Signal) 610 with a given periodicity, a DL BWP (for example, 24 PRBs) 620 and a DL sub-BWP for IoT (for example, 6 PRBs) 630.

The example embodiments provide measurement relaxation in IOT. The example embodiments provide an operation mode for IOT operation providing low latency in UL with a very small power consumption. The operation mode of the example embodiments may be based on a specific BWP configuration defined for IOT terminals.

In an example configuration, an IOT terminal that is configured with particular active bandwidth part (for example, 24 PRBs) is operating in a narrowband mode within the configured DL BWP (→DL sub-BWP). FIG. 5 illustrates an example framework of the configuration.

UE 110 may be configured with active (DL) BWP of 24 PRBs. Signal facilitating time and frequency tracking for UE 110 is TRS. Synchronization signal block, SSB consisting of PSS/SSS/PBCH may be used complementary or additionally (SSB covers 20 PRBs). TRS is transmitted with particular periodicity ([10, 20, 40, 80] ms). TRS covers the entire BWP (=24 PRBs in the current examples). TRS BW in NR Rel-15 is: min (BWP, 52 PRBs).

RF bandwidth of IOT terminal covers a fraction of the active DL BWP: it equals to 6 PRBs in the example shown in FIG. 5. UL RF BW for a UE 110 can be the same as in the DL, or different than in the DL.

The IOT terminal operating within the DL sub-BWP benefits from measurement relaxation (compared to normal BWP operation). An example primary measurement relaxation scheme: Reduced measurement bandwidth→reduced amount of processing for DL synchronization signal in frequency. An example secondary measurement relaxation scheme: Reduced measurement periodicity→reduced amount of processing for DL synchronization signal in time. In an example embodiment cell-specific signal is used for measurement (for example, PSS/SSS/PBCH DMRS). For beamformed based operation, UE 110 may be monitoring multiple SSBs. This can be reduced also to monitoring only the preferred SSB unless measurement has degraded beyond certain criteria.

Regardless of the reduced synchronization accuracy (due to measurement relaxation), the IOT terminal is capable of transmitting predefined UL (controls) signals at the time when it's operating according to relaxed time/frequency synchronization and sub-BWP. Related details of UL BWP configuration & operation are discussed in more details herein below.

When operating according to sub-BWP configuration in UL, the IOT terminal may not be able adjust the UL timing advance (UL TA may be updated again when the UL returns back to normal active BWP-based operation).

Figure 7:
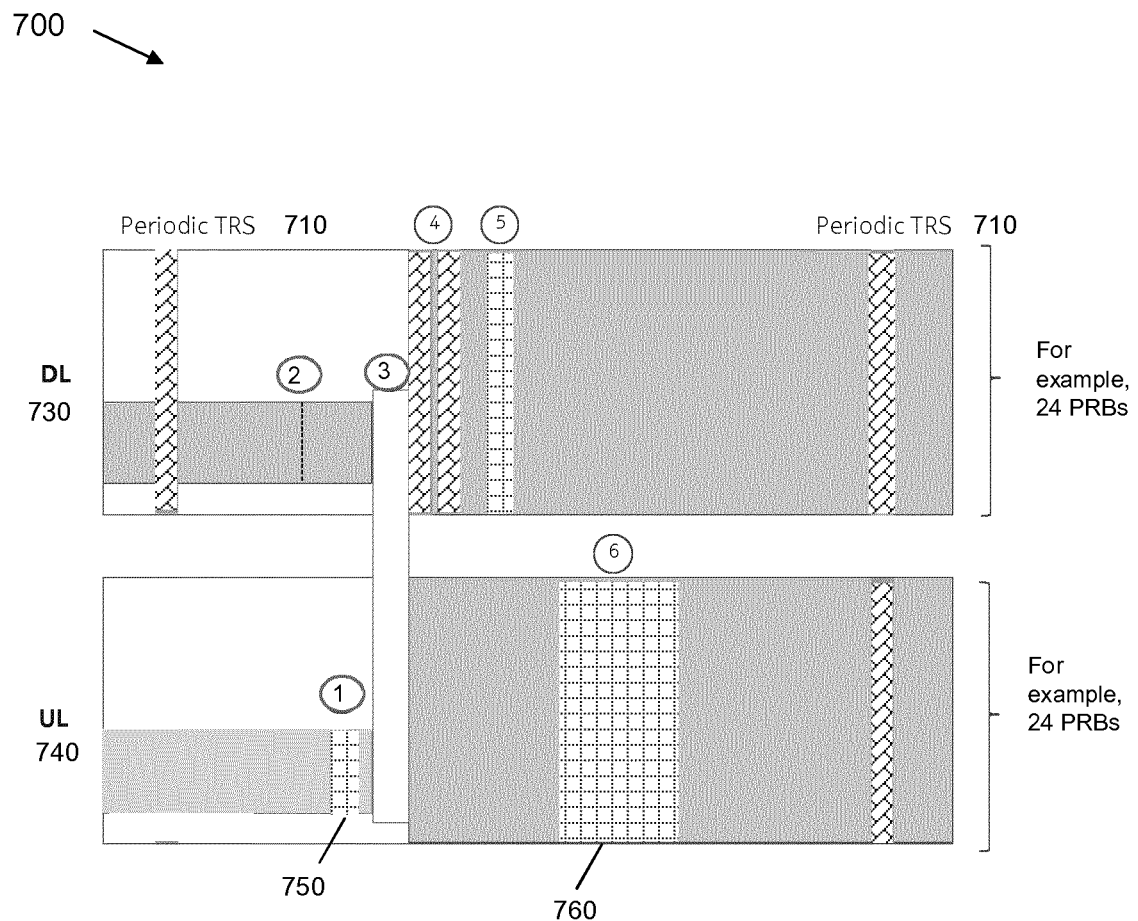
FIG. 7 illustrates an example BWP adaptation.

FIG. 7 illustrates an example BWP adaptation 700. FIG. 7 illustrates an example operation (with corresponding steps 0 to 6) for UE (=IOT terminal) when configured to sub-BWP operation. The operation 700 includes periodic TRS 710 for DL 730.

At step 0 (not shown in FIG. 7), UE 110 is operating with predefined DL sub-BWP. In an example embodiment, gNB 170 configures the size and location of the DL sub-BWP within the DL BWP. The UE 110 (may or) may not be able to receive DL control channel when operating according to sub-BWP configuration. In the latter case, UE 110 may periodically switch to back to BWP-operation to monitor DL control channel, for example, according to the predefined paging occasions.

At step 1, UL data arrives in the UE's 110 buffer (for example, from higher layers). UE 110 prepares to transmit a predefined UL signal using the sub-BWP configuration defined for UL operation (UL sub-BWP). The example shown in FIG. 7 illustrated the case where the sub-bandwidth part based operation covers both uplink operation and downlink operation. This may not be always the case. In another embodiment, DL (or UL) may be switching between sub-BWP and BWP configurations whereas UL (or DL) is operating all the time according to BWP configuration.

At step 2, UE 110 transmits a predefined UL signal (signal #2). The used resources and the signal formats are preconfigured by gNB 170 (transmission may involve multiple repetitions in order to maximize the coverage/reliability). In an example embodiment, UL signal to be transmitted is a dedicated scheduling request or a dedicated PRACH preamble. In another example embodiment, SR or PRACH preamble may be configured to be common for a group of (IOT) UEs 110. In yet another example embodiment, transmission may contain not only preamble but also PUSCH data.

At step 3, UE 110 performs a switching from sub-BWP to BWP-based operation (for both DL and UL). This includes a possibility for RF retuning at the UE 110. Accordingly, UE 110 may be able to change the center frequency of the oscillator, and it may be able to adapt analog filters (for both DL and UL) and analog-to-digital or digital-to-analog conversion circuits according to BWP based operation. The maximum duration of step 3 may be predefined by the specification. It may be, for example, on the order of 0.5 ms or higher.

At step 4, UE 110 may assume that aperiodic (wideband) TRS is available after step 3 (for example, based on gNB 170 triggering), such that UE 110 is able to perform frequency/timing synchronization (right) after the RF retuning UE 110 may be able to perform frequency/timing synchronization also from other DL signals, such as PDCCH DMRS.

At step 5, UE 110 starts monitoring PDCCH according to a predefined configuration (defined for normal BWP operation). UE 110 determines that UL resource allocation grant has been received, based on PDCCH monitoring. This step may also involve receiving SRS/PRACH request from the gNB 170 (as it will enable TA update later on). Another option is to use preconfigured SRS/PRACH resources.

At step 6, UE 110 transmits PUSCH (and possibly also SRS) according to received UL resource allocation grant.

At step 7 (step not shown), UE 110 may receive TA update, receive DL data, and receive UL data based on gNB 170 scheduling decision.

The UE 110 may fall back to sub-BWP mode (and corresponding RF configuration) at some point, for example, when the UE 110 buffer is empty again. The exact fall-back time may be based, for example, on the explicit indication from gNB 170 and/or inactivity timer.

When UE 110 is operating according to sub-BWP configuration, it may be seen as the DRX from higher layer point of view (for example, the gNB 170 or other network device may schedule DL/UL data only at certain predefined time instants when UE 110 is occasionally configured with normal BWP-based operation).

In an embodiment, DL sub-BWP signal (such as cell-common sequence) is used to wake up the UE 110 for DL data reception (rather than define periodic period where UE operates in BWP mode). According to example embodiments, UE 110 may be put into sub-BWP mode until either woken up by the gNB 170 or until it has UL data to transmit.

Figure 8:
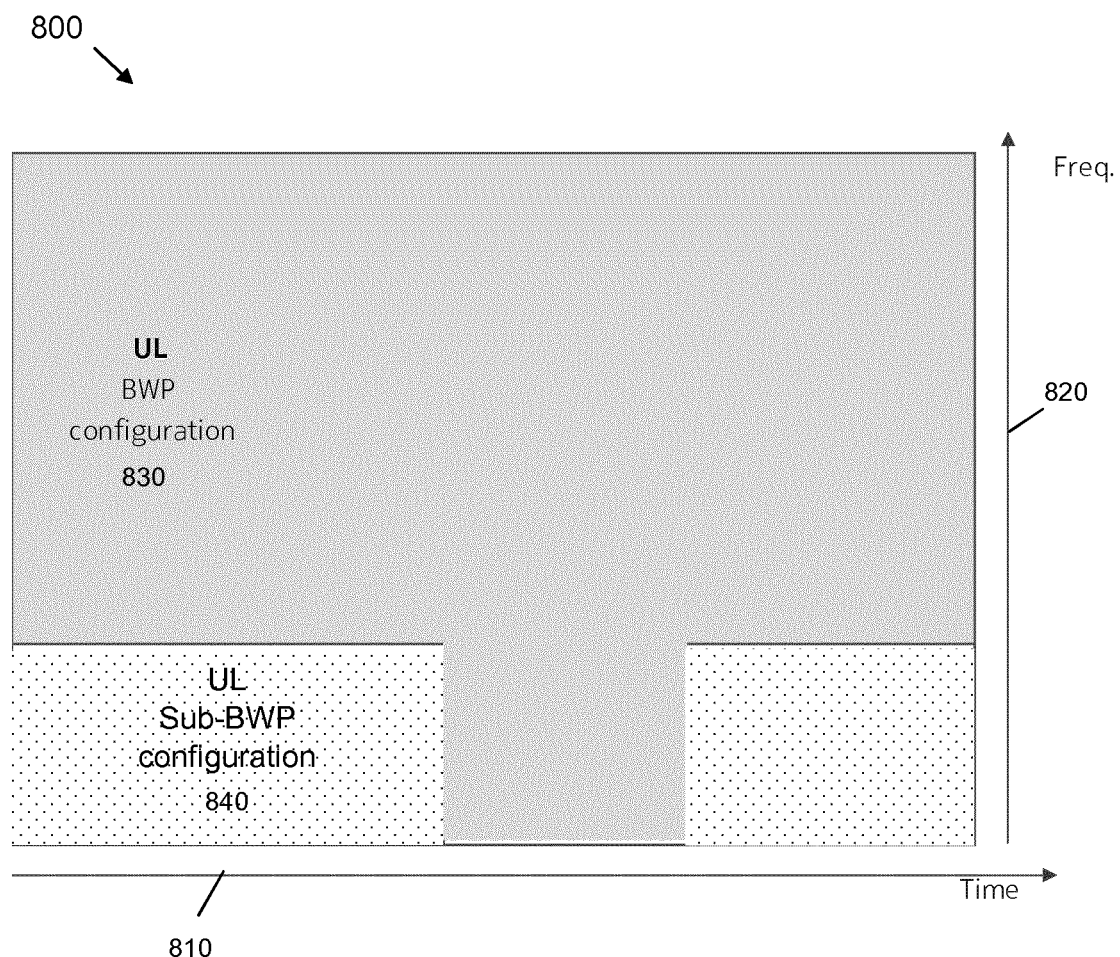
FIG. 8 illustrates example embodiments of different UL BWP configurations in frequency/time.

FIG. 8 illustrates example embodiments 800 of different UL BWP configurations in frequency/time.

With regard to UE BWP operation, gNB 170 may need to have special arrangements for UL sub-BWP 840 operation taking place when UE 110 is having reduced synchronization accuracy in frequency and/or time. In an example embodiment, such operation confined within specific time 810/frequency resources 820 (→see example in FIG. 8). Due to worsened synchronization, there may be a need for guard band/time between resources to be used according to active BWP configuration.

UL sub-BWP 840 may not need to be located within the (active) UL BWP 830. UL sub-BWP 840 may operate according to a specific numerology (for example, subcarrier spacing<SCS defined for UL BWP 830). For example, UL sub-BWP 840 may operate according to SCS 3.75 kHz or 7.5 kHz which have longer cyclic prefix (→these SCSs may be more robust against UL time synchronization errors). UL sub-BWP 840 may be dimensioned according to the signal to be transmitted (for example, signal #2 (at step 2) in FIG. 7). Depending on the bandwidth of sub-BWP, UL sub-BWP 840 can be seen as UL BWP for an UE.

For UL sub-BWP 840 operation, UE 110 may be configured via higher layers with all the necessary Tx parameters corresponding to signal #2 in FIG. 7. These signals may have a predefined periodicity, slot/symbol offset and duration. Transmission may be based on a predefined/preconfigured format(s), such as a PUCCH format defined for SR, or a PRACH format. Transmission may be done using preconfigured resources (such as resource index, cyclic shift, PRBs, orthogonal cover codes, DMRS resources). Resources may contain also data part (for example, with a predefined MCS). In this case, transmission may be seen as contention-based two-step RACH.

Figure 9:
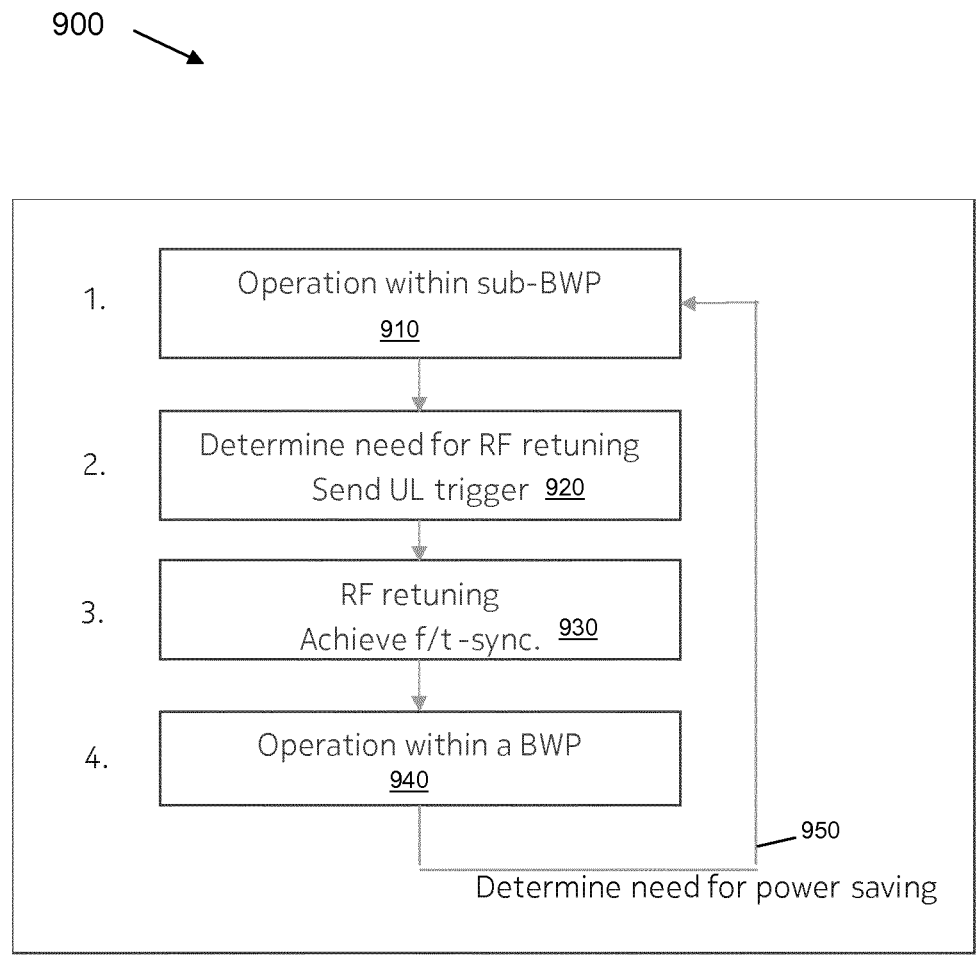
FIG. 9 shows a flow diagram of a method in accordance with example embodiments which may be performed by an apparatus.

FIG. 9 shows a flow diagram 900 representing UE 110 operation according to an example embodiment.

At the beginning, at step 1, UE 110 is operating according to sub-BWP configuration in both UL and DL (block 910). For DL operation, sub-BWP may contain just a bandwidth configuration (location, size), and predefined rules for DL synchronization signal (such as TRS, SSB) handling. In an embodiment, UL sub-BWP is a subset of active UL BWP configuration. In another embodiment, UL sub-BWP configuration is a specific (separate) UL BWP configuration (which may or may not overlap in frequency with the active UL BWP). In yet another embodiment, UL sub-BWP configuration is the same as active UL BWP configuration.

At step 2 (block 920), consistent with example embodiments described herein, (latency critical) data in UE buffer may determine the requirement (for example, need) for RF retuning. This need may be initiated by UL trigger (step #2 in FIG. 7). In an alternate example embodiment, the RF retuning may be initiated by a time-based trigger, which allows UE 110 to perform PDCCH monitoring, for example, for paging, or other purpose, for other time periods based on active BWP configuration.

UE 110 may perform a switching from sub-BWP to BWP-based operation for at least one of DL and UL. This includes a possibility for RF retuning at the UE 110 (step 3, block 930). Retuning may be required in order to operate again according to BWP-based operation. Retuning involves change of at least one of: change of center frequency, or change of RF bandwidth. Accordingly, UE 110 may be able to change the center frequency of the oscillator, and may be able to adapt analog filters (for DL and/or UL) according to BWP based operation. UE 110 may assume that aperiodic (wideband) TRS or other predefined DL RS is available after step 3 (based on gNB triggering), such that UE 110 is able to perform frequency/timing synchronization (for example, immediately) after the RF retuning. Wideband PDCCH DMRS is an example of the other predefined DL RS.

UE 110 may perform operation within a BWP (step 4, block 940). For example, UE 110 may start monitoring PDCCH according to a predefined configuration. UE 110 determines that UL resource allocation grant has been received, based on PDCCH monitoring. This step may involve also SRS/PRACH request from the UE 110 (this will enable TA update). UE 110 transmits PUSCH (and possibly also SRS) according to received UL resource allocation grant. UE 110 may also receive TA update, receive DL data, and receive UL data based on gNB 170 scheduling decision.

UE 110, at 950, may determine the need for power saving, returning to step 1 (block 910).

At step 5 (not shown in FIG. 9), the UE 110 may fall back to sub-BWP mode (and corresponding RF configuration) at some point, for example, when the UE buffer is empty again. The exact fall-back time may be based, for example, on the explicit indication from gNB 170 and/or inactivity timer.

Without in any way limiting the scope, interpretation, or application of the claims appearing below, a technical effect of one or more of the example embodiments disclosed herein is to support low power consumption at a same time (concurrently) with reasonable latency performance (for example, latency acceptable for a majority of current applications). This feature may be beneficial for not only for IOT terminals, but also for normal UEs. The example embodiments require limited (for example, quite small) additional specification to support power optimized mode (for example, the example embodiments may reuse the existing control channels defined for NR-Rel-15).

Another technical effect of the example embodiments is to reduce UE cost, particularly when combined with 3.75 kHz subcarrier spacing (for example, for both UL and DL). A further technical effect is that the example embodiments require no additional overhead due to power optimized operation: relaxed measurement configuration can be done based on current signals. Another technical effect of the example embodiments is that added system complexity is (for example, relatively) small since control channel are untouched. Impact to the gNB scheduler operation is also minor.

An example embodiment may provide a method comprising performing, by a terminal device, a sub-bandwidth part based operation; determining a requirement for radio frequency retuning; switching from the sub-bandwidth part based operation to a bandwidth part based operation; and performing the bandwidth part based operation.

In accordance with the example embodiments as described in the paragraphs above, wherein the sub-bandwidth part based operation is in at least one of an uplink operation and a downlink operation.

In accordance with the example embodiments as described in the paragraphs above, wherein for the downlink operation, the at least one sub-bandwidth part contains only a bandwidth configuration, and predefined rules for downlink synchronization signal handling.

In accordance with the example embodiments as described in the paragraphs above, wherein an at least one uplink sub-bandwidth part is a subset of active uplink bandwidth part configuration.

In accordance with the example embodiments as described in the paragraphs above, wherein the at least one uplink sub-bandwidth part is a specific uplink bandwidth part configuration.

In accordance with the example embodiments as described in the paragraphs above, wherein an uplink sub-bandwidth part configuration is same as an active uplink bandwidth part configuration.

In accordance with the example embodiments as described in the paragraphs above, wherein determining the requirement for the radio frequency retuning further comprises initiating the radio frequency retuning, for at least one of an uplink operation and a downlink operation, based on uplink data in a buffer associated with the terminal device.

In accordance with the example embodiments as described in the paragraphs above, wherein determining the requirement for the radio frequency retuning further comprises determining the requirement based on a time-based trigger, wherein the time-based trigger instructs the terminal device to perform physical downlink control channel monitoring.

In accordance with the example embodiments as described in the paragraphs above, wherein performing a switching from the sub-bandwidth part based operation to the bandwidth part based operation further comprises performing radio frequency retuning; and performing frequency and time synchronization.

In accordance with the example embodiments as described in the paragraphs above, assuming that an aperiodic tracking reference signal is available; and performing frequency/timing synchronization subsequent to the radio frequency retuning.

In accordance with the example embodiments as described in the paragraphs above, wherein determining the requirement for the radio frequency retuning further comprises sending an uplink trigger, wherein the uplink trigger is one of a trigger only and a trigger plus a limited amount of data An example embodiment may be provided in an apparatus comprising at least one processor; and at least one non-transitory memory including computer program code, the at least one memory and the computer program code may be configured to, with the at least one processor, cause the apparatus to: perform a sub-bandwidth part based operation; determine a requirement for radio frequency retuning; switch from the sub-bandwidth part based operation to a bandwidth part based operation; and perform the bandwidth part based operation.

In accordance with the example embodiments as described in the paragraphs above, wherein the sub-bandwidth part based operation is in at least one of an uplink operation and a downlink operation.

In accordance with the example embodiments as described in the paragraphs above, wherein for the downlink operation, the at least one sub-bandwidth part contains only a bandwidth configuration, and predefined rules for downlink synchronization signal handling.

In accordance with the example embodiments as described in the paragraphs above, wherein an at least one uplink sub-bandwidth part is a subset of active uplink bandwidth part configuration.

In accordance with the example embodiments as described in the paragraphs above, wherein the at least one uplink sub-bandwidth part is a specific uplink bandwidth part configuration.

In accordance with the example embodiments as described in the paragraphs above, wherein an uplink sub-bandwidth part configuration is same as an active uplink bandwidth part configuration.

In accordance with the example embodiments as described in the paragraphs above, wherein, when determining the requirement for the radio frequency retuning, the at least one processor is further to initiate the radio frequency retuning, for at least one of an uplink operation and a downlink operation, based on uplink data in a buffer associated with the terminal device.

In accordance with the example embodiments as described in the paragraphs above, determine the requirement based on a time-based trigger, wherein the time-based trigger instructs the terminal device to perform physical downlink control channel monitoring.

An example embodiment may be provided in an apparatus comprising means for performing a sub-bandwidth part based operation; means for determining a requirement for radio frequency retuning; means for switching from the sub-bandwidth part based operation to a bandwidth part based operation; and means for performing the bandwidth part based operation.

In accordance with the example embodiments as described in the paragraphs above, wherein the operation within a sub-bandwidth part is in at least one of an uplink operation and a downlink operation.

In accordance with the example embodiments as described in the paragraphs above, wherein for the downlink operation, the at least one sub-bandwidth part contains only a bandwidth configuration, and predefined rules for downlink synchronization signal handling.

In accordance with the example embodiments as described in the paragraphs above, wherein an at least one uplink sub-bandwidth part is a subset of active uplink bandwidth part configuration.

In accordance with the example embodiments as described in the paragraphs above, wherein the at least one uplink sub-bandwidth part is a specific uplink bandwidth part configuration.

In accordance with the example embodiments as described in the paragraphs above, wherein an uplink sub-bandwidth part configuration is same as an active uplink bandwidth part configuration.

In accordance with the example embodiments as described in the paragraphs above, wherein the means for determining the requirement for the radio frequency retuning further comprises: means for determining the requirement based on a time-based trigger, wherein the time-based trigger instructs the terminal device to perform physical downlink control channel monitoring.

In accordance with the example embodiments as described in the paragraphs above, means for sending an uplink trigger, wherein the uplink trigger is one of a trigger only and a trigger plus a limited amount of data.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
   performing, by a terminal device, a sub-bandwidth part based operation;
   determining a requirement for radio frequency retuning;
   initiating the radio frequency retuning;
   based on a triggering of a radio access network node, determining an aperiodic tracking reference signal is available;
   based on the determining, performing at least one of frequency and timing synchronization subsequent to the radio frequency retuning;
   switching from the sub-bandwidth part based operation to a bandwidth part based operation; and
   performing the bandwidth part based operation.

2. The method of claim 1, wherein the sub-bandwidth part based operation is in at least one of an uplink operation and a downlink operation.

3. The method according to claim 2, wherein for the downlink operation, at least one sub-bandwidth part contains a bandwidth configuration.

4. The method according to claim 2, wherein an at least one uplink sub-bandwidth part is a subset of an active uplink bandwidth part configuration.

5. The method according to claim 2, wherein the at least one uplink sub-bandwidth part is a specific uplink bandwidth part configuration.

6. The method according to claim 2, wherein an uplink sub-bandwidth part configuration is same as an active uplink bandwidth part configuration.

7. The method according to claim 1, wherein determining the requirement for the radio frequency retuning further comprises:
   initiating the radio frequency retuning, for at least one of an uplink operation and a downlink operation, based on uplink data in a buffer associated with the terminal device.

8. The method according to claim 1, wherein determining the requirement for the radio frequency retuning further comprises:
   determining the requirement based on a time-based trigger, wherein the time-based trigger instructs the terminal device to perform physical downlink control channel monitoring.

9. The method according to claim 8, wherein performing a switching from the sub-bandwidth part based operation to the bandwidth part based operation further comprises:
performing radio frequency retuning; and
performing frequency and time synchronization.

10. The method according to claim 1, wherein determining the requirement for the radio frequency retuning further comprises sending an uplink trigger, wherein the uplink trigger is one of a trigger only and a trigger plus a limited amount of data.

11. An apparatus, comprising at least one processor, and at least one non-transitory memory including computer program code, the at least one memory and the computer program code configured to, with the at least one processor, cause the apparatus to:
perform a sub-bandwidth part based operation;
determine a requirement for radio frequency retuning;
initiate the radio frequency retuning;
based on a triggering of a radio access network node, determine an aperiodic tracking reference signal is available;
based on the determining, perform at least one of frequenc and timing synchronization subsequent to the radio frequency retuning;
switch from the sub-bandwidth part based operation to a bandwidth part based operation; and
perform the bandwidth part based operation.

12. The apparatus of claim 11, wherein the sub-bandwidth part operation is in at least one of an uplink operation and a downlink operation.

13. The apparatus according to claim 12, wherein for the downlink operation, the at least one sub-bandwidth part contains only a bandwidth configuration.

14. The apparatus according to claim 12, wherein an at least one uplink sub-bandwidth part is a subset of active uplink bandwidth part configuration.

15. The apparatus according to claim 12, wherein the at least one uplink sub-bandwidth part is a specific uplink bandwidth part configuration.

16. The apparatus according to claim 12, wherein an uplink sub-bandwidth part configuration is same as an active uplink bandwidth part configuration.

17. The apparatus according to claim 11, wherein the at least one memory and the computer program code are configured to, with the at least one processor, cause the apparatus to determine the requirement for the radio frequency retuning by:
determining the requirement based on a time-based trigger, wherein the time-based trigger instructs the terminal device to perform physical downlink control channel monitoring.

18. The apparatus according to claim 11, wherein the at least one memory and the computer program code are configured to, with the at least one processor, cause the apparatus to determine the requirement for the radio frequency retuning by:
sending an uplink trigger, wherein the uplink trigger is one of a trigger only and a trigger plus a limited amount of data.

19. The non-transitory program storage device of claim 11, wherein the operation within the at least one sub-bandwidth part is in at least one of an uplink operation and a downlink operation.

20. A non-transitory program storage device readable by a machine, tangibly embodying a program of instructions executable by the machine for performing operations, the operations comprising:
performing, by a terminal device, an operation within at least one sub-bandwidth part;
determining a requirement for radio frequency retuning;
initiating the radio frequency retuning;
based on a triggering of a radio access network node, determining an aperiodic tracking reference signal is available;
based on the determining, performing at least one of frequency and timing synchronization subsequent to the radio frequency retuning;
switching from the operation within the at least one sub-bandwidth part based operation to a bandwidth part based operation; and
performing the bandwidth part based operation.

* * * * *